US011981123B2

(12) United States Patent
Suzuki

(10) Patent No.: US 11,981,123 B2
(45) Date of Patent: May 14, 2024

(54) IMAGE FORMING DEVICE

(71) Applicant: Brother Kogyo Kabushiki Kaisha, Nagoya (JP)

(72) Inventor: Takashi Suzuki, Toyota (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 11 days.

(21) Appl. No.: 17/563,283

(22) Filed: Dec. 28, 2021

(65) Prior Publication Data

US 2022/0203721 A1 Jun. 30, 2022

(30) Foreign Application Priority Data

Dec. 29, 2020 (JP) ................................ 2020-219783

(51) Int. Cl.
*B41J 2/175* (2006.01)
*B41J 11/42* (2006.01)

(52) U.S. Cl.
CPC .................................... *B41J 11/42* (2013.01)

(58) Field of Classification Search
CPC ............................... B41J 2/17566; B41J 11/42
See application file for complete search history.

(56) References Cited

U.S. PATENT DOCUMENTS

| | | | | | |
|---|---|---|---|---|---|
| 5,229,791 | A * | 7/1993 | Kuboki | H04N 1/128 347/3 |
| 6,223,131 | B1 | 4/2001 | Kanaya et al. | |
| 6,609,461 | B2 * | 8/2003 | Horii | G03G 15/5079 347/7 |
| 2007/0263022 | A1 | 11/2007 | Chigusa | |
| 2020/0156390 | A1 * | 5/2020 | Llosa | B65H 26/06 |

FOREIGN PATENT DOCUMENTS

| | | | |
|---|---|---|---|
| JP | H09-131897 | A | 5/1997 |
| JP | 2006-335043 | A | 12/2006 |

* cited by examiner

*Primary Examiner* — Jason S Uhlenhake
(74) *Attorney, Agent, or Firm* — Banner & Witcoff, Ltd.

(57) ABSTRACT

An image forming device includes a first supplier configured to supply a long recording medium, an image forming engine configured to form an image on the recording medium supplied from the first supplier using a color material supplied from a color reservoir, a remaining amount output device configured to output a signal indicating a remaining amount of the color material. The image forming device derives a length of a recording medium on which images can be formed until a color material in the color reservoir runs out, and displays the length of the recording medium on which the images can be formed derived in the deriving on a display.

17 Claims, 8 Drawing Sheets

APPROXIMATE LENGTH [inches] OF SHEET ON WHICH IMAGES CAN BE FORMED (ISO EQUIVALENTS)

900 880 930 940

APPROXIMATE LENGTH [feet] OF SHEET ON WHICH IMAGES CAN BE FORMED (ISO EQUIVALENTS)

140 180 200 260

IMAGE FORMING DEVICE

CROSS-REFERENCE TO RELATED APPLICATIONS

This application claims priority under 35 U.S.C. § 119 from Japanese Patent Application No. 2020-219783 filed on Dec. 29, 2020. The entire subject matter of the application is incorporated herein by reference.

BACKGROUND

The present disclosures related to an image forming device.

There has been conventionally known an inkjet recording device that uses ink to form images, and is configured to display information on the number of sheets that can be printed with the remaining amount of ink, based on statistical data of the used amount of ink and the number of sheets printed.

SUMMARY

Some image forming devices are configured to print on long recording media, such as roll sheet, instead of cut sheet. In such image forming devices, the length of one printed recording medium is often different from a specified size such as an A4 size or a B5 size. Further, the length of one printed recording medium may vary each time when printing is performed. Therefore, in such image forming devices, even if the number of sheets that can be printed is displayed using the conventional technology, it is difficult for the user to easily grasp how many sheets can be printed before the ink runs out.

According to aspects of the present disclosures, there is provided an image forming device including a first supplier configured to supply a long recording medium, an image forming engine configured to form an image on the recording medium supplied from the first supplier using a color material supplied from a color reservoir, the color reservoir being configured to store the color material, a remaining amount output device configured to output a signal indicating a remaining amount of the color material stored in the color reservoir, and a controller. The controller can perform deriving a length of a recording medium on which images can be formed until the color material in the color reservoir runs out based on the signal output by the remaining amount output device. Further, the controller can perform displaying the length of the recording medium on which the images can be formed derived in the deriving on a display.

DETAILED DESCRIPTION OF THE EMBODIMENTS

Overall Configuration of Printer

Figure 1:
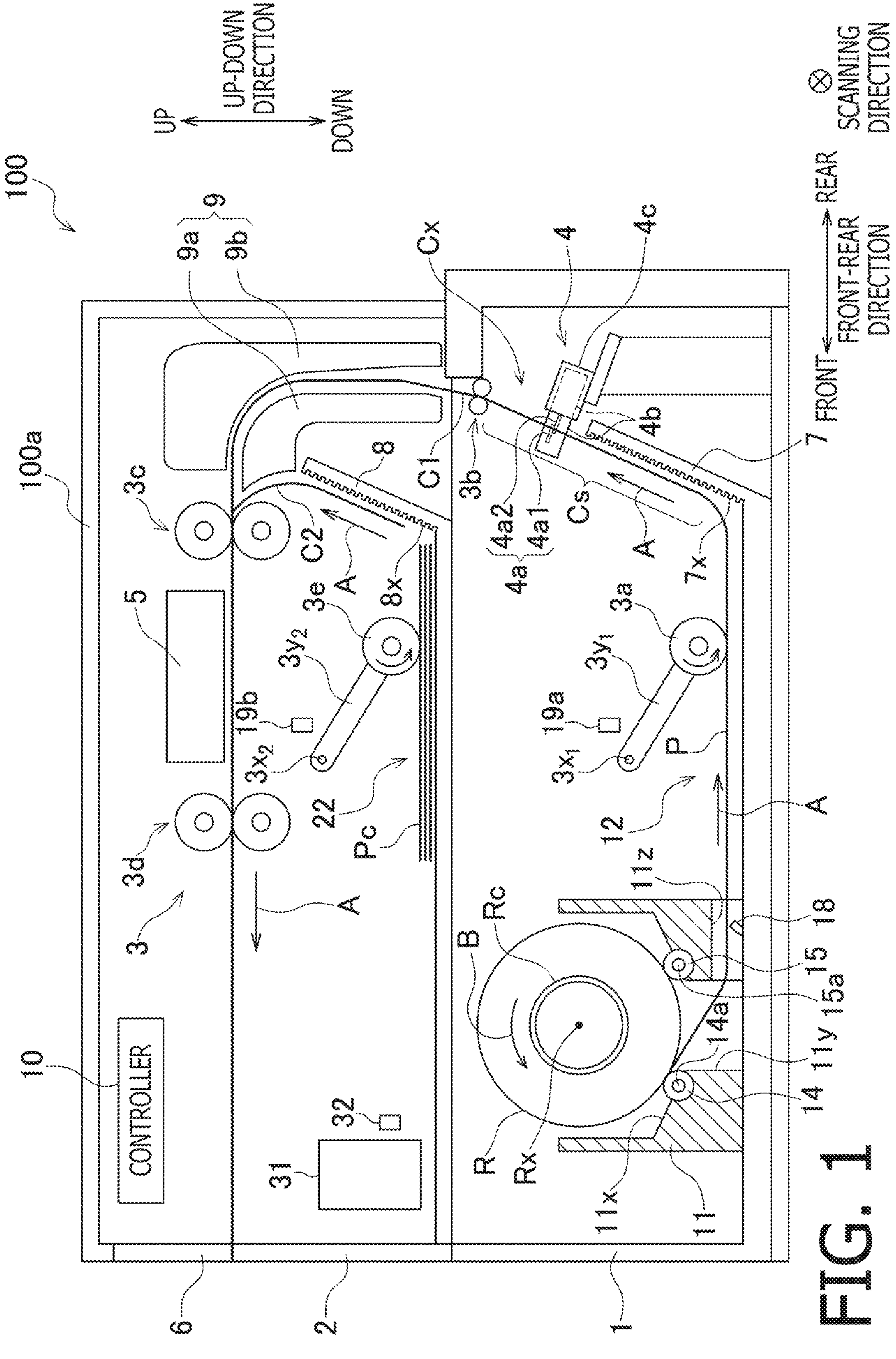
FIG. 1 shows an overall configuration of a printer according to one embodiment of the present disclosures.
Figure 2:
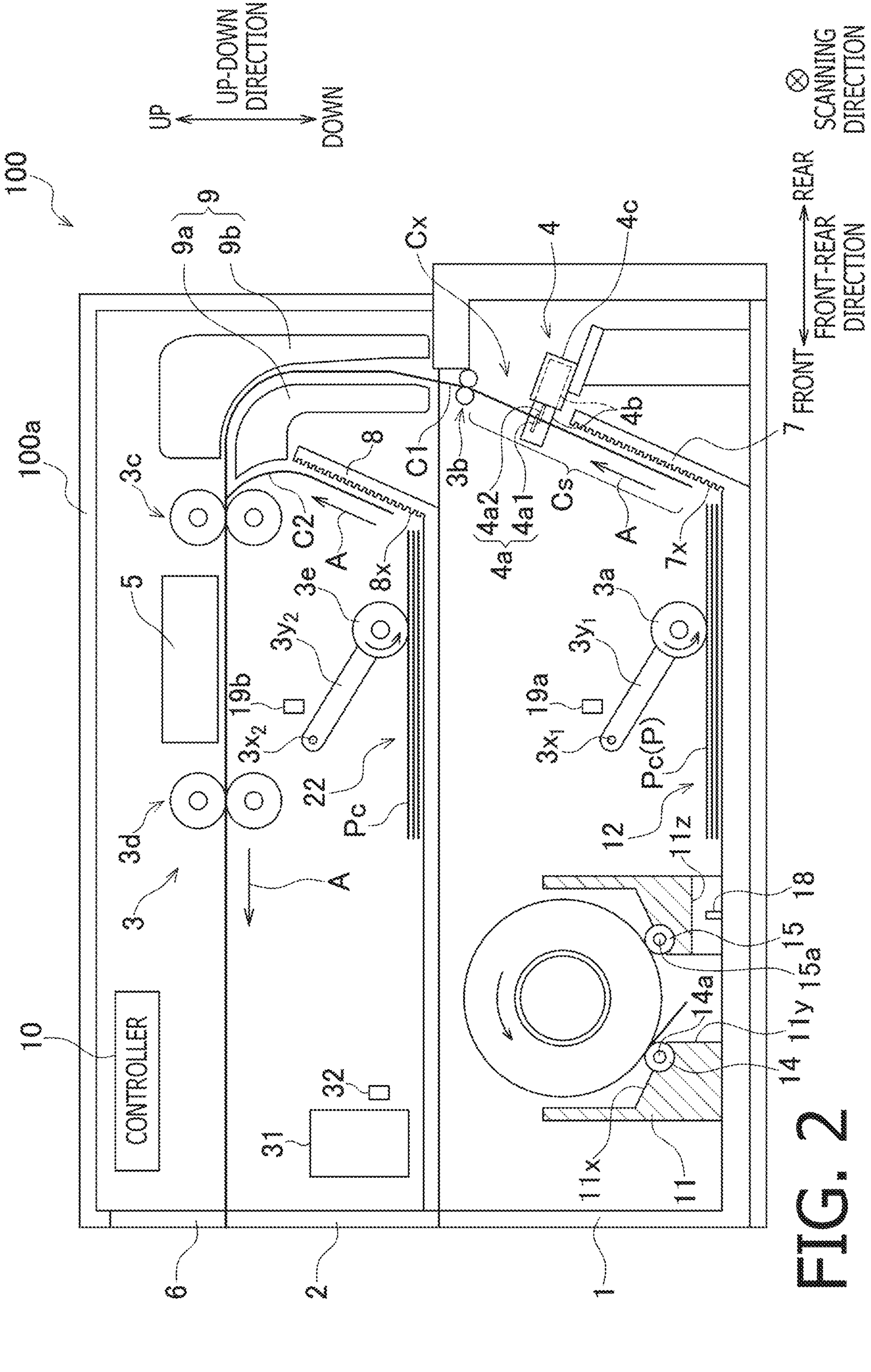
FIG. 2 shows the overall configuration of the printer shown in FIG. 1, with cut sheets being accommodated.

First, referring to FIGS. 1 and 2, an overall configuration of the printer 100 (i.e., an example of an image forming device) according to one embodiment of the present disclosures will be described. Vertical and horizontal directions shown in FIGS. 1 and 2 are defined as vertical (i.e., un-down) and horizontal (i.e., front-rear) directions of the printer 100. In this embodiment, the printer 100 is an inkjet printer configured to form an image by ejecting ink droplets onto a recording medium.

The printer 100 includes a housing 100*a*, a lower sheet feed tray 1, an upper sheet feed tray 2, a conveyance mechanism 3, a cutter mechanism 4, a head 5, a sheet discharge tray 6, an ink reservoir 31, and a controller 10. The lower sheet feed tray 1 and the upper sheet feed tray 2 have a box shape that opens upward. The upper sheet feed tray 2 can be attached to and removed from the lower part of the housing 100*a*, and the lower sheet feed tray 1 can be attached to and removed from the lower part of the upper sheet feed tray 2. The printer 100 is equipped with a tray sensor 34 (see FIG. 3) that detects whether or not the lower sheet feed tray 1 and the upper sheet feed tray 2 are attached in place. The sheet discharge tray 6 includes a front wall of an upper part of the housing 100*a* and can be opened and closed with respect to the housing 100*a*.

The lower sheet feed tray 1 has a roll sheet container 11 configured to accommodate a roll body R (see FIG. 1) on which a long sheet (i.e., a continuous sheet) is wound, and a cut sheet container 12 configured to accommodate cut sheet Pc (see FIG. 2). The lower sheet feed tray 1 corresponds to a “first supplier” according to the present disclosures. The long sheet is an example of a recording medium.

The roll body R (see FIG. 1) is configured such that a long sheet of paper is wound around on an outer circumference of a cylindrical core member Rc in the form of a roll. The roll body R is accommodated in the roll sheet container 11 with its rotation axis Rx (i.e., a central axis of the core member Rc) aligned along a direction orthogonal to the vertical and horizontal directions (i.e., a “scanning direction” described below, and a width direction of the sheet P).

The roll sheet container 11 has a recess 11*x* configured to accommodate the roll body R. Two rollers 14 and 15 are provided at the bottom of the recess 11*x*. The two rollers 14 and 15 are arranged rotatable around the axes 14*a* and 15*a*, respectively, each of which extends in the scanning direction. When the roll body R is accommodated in the recess 11*x*, an outer circumferential surface of a lower portion of the roller body R is supported by the two rollers 14 and 15.

The roll sheet container 11 further has a hole 11*y* extending vertically and communicating with the recess 11*x*, and a groove 11*z* extending horizontally and communicating with the hole 11*y*. Both the hole 11*y* and the groove 11*z* have openings on the bottom of the roll sheet container 11. The roll sheet P unwound from the roll body R is conveyed through the holes 11*y* and grooves 11*z* toward the head 5.

The cut sheet Pc (see FIG. 2) is a sheet P (which is an example of a recording medium) of which length is shorter than that of the sheet constituting the roll body R. The cut sheet container 12 is a space defined on a rear side of the roll sheet container 11 in the lower sheet feed tray 1, and can accommodate a plurality of cut sheets Pc stacked in the vertical direction.

In the printer 100, when a roll of paper R is used, the cut sheet Pc is removed from the cut sheet container 12 (see FIG. 1). When the cut sheet Pc is used, the roll body R is removed from the roll sheet container 11 or the roll sheet P is unwound from the roll body R to a position where unwound sheet does not interfere with a conveying path of the cut sheet Pc. The unwound roll sheet P is then rewound (see FIG. 2). In this way, the lower sheet feed tray 1 can accommodate the roll body R and the cut sheet Pc together, but there are restrictions on usage thereof because they share the lower feeding roller 3*a*, as described below.

The upper sheet feed tray 2 is provided with a cut sheet container 22 that can accommodate the cut sheets Pc. The upper sheet feed tray 2 corresponds to a "second supplier" according to aspects of the present disclosures. The cut sheets Pc in the upper sheet feed tray 2 may have the same length as those stored in the lower sheet feed tray 1, or may have a different length. The cut sheet container 22 is configured to accommodate a plurality of cut sheets Pc stacked in the vertical direction.

The conveyance mechanism 3 is configured to selectively convey the sheets P from three containers (i.e., the roll sheet container 11 and the cut sheet containers 12 and 22). The conveyance mechanism 3 includes a lower feeding roller 3*a*, an intermediate roller pair 3*b*, a conveyance roller pair 3*c*, a sheet discharge roller pair 3*d*, an upper feeding roller 3*e*, and guides 7, 8, and 9. The conveyance mechanism 3 constitutes two conveyance paths C1 and C2. The conveyance path C1 is a path extending from one of the roll sheet container 11 and the cut sheet container 12, to the sheet discharge tray 6 passing below the head 5, where the sheet P is conveyed in a conveyance direction A. The conveyance path C2 is a path extending from a cut sheet container 22 to the sheet discharge tray 6 passing below the head 5, where the sheet P is conveyed in the conveyance direction A.

The lower feeding roller 3*a* is located above the cut sheet container 12 and is arranged between the roll sheet container 11 and the head 5 in the conveyance path C1. The intermediate roller pair 3*b* is located between the lower feeding roller 3*a* and the head 5 in the conveyance path C1. The conveyance roller pair 3*c* is disposed between the intermediate roller pair 3*b* and the head 5 in the conveyance path C1. The sheet discharge roller pair 3*d* is arranged between the head 5 and the sheet discharge tray 6 in the conveyance path C1.

The upper feeding roller 3*e* is above the cut sheet container 22 and is arranged upstream from the conveyance roller pair 3*c* in the conveyance path C2. The conveyance roller pair 3*c* is arranged between the upper feeding roller 3*e* and the head 5 in the conveyance path C2. The sheet discharge roller pair 3*d* is arranged between the head 5 and the sheet discharge tray 6 in the conveyance path C2.

The lower feeding roller 3*a* is axially supported by a tip end of an arm 3*y*1. The arm 3*y*1 is freely supported by a support shaft 3*x*1, and the lower feeding roller 3*a* is driven so as to approach a bottom surface of the lower sheet feed tray 1. As shown in FIG. 1, in a state where the roll body R is accommodated in the roll sheet container 11 and the cut sheet Pc is not accommodated in the cut sheet container 12, when a lower feed motor (not shown) is driven under control of the controller 10 and the lower feeding roller 3*a* rotates, the roll body R rotates in an arrow direction B, and the roll sheet unwound from the roll body R is fed toward the intermediate roller pair 3*b*. Alternatively, as shown in FIG. 2, in a state where the cut sheet Pc is accommodated in the cut sheet container 12, when the lower feed motor is driven under control of the controller 10 and the lower feeding roller 3*a* rotates while the cut sheet Pc at the uppermost position among the plurality of cut sheets Pc accommodated in the cut sheet container 12 is fed toward the intermediate roller pair 3*b*.

The upper feeding roller 3*e* is axially supported by a tip end of an arm 3*y*2. The arm 3*y*2 is freely supported by a support shaft 3*x*2, and the upper feeding roller 3*e* is driven so as to approach a bottom surface of the upper sheet feed tray 2. As shown in FIG. 2, in a state where the cut sheet Pc is accommodated in the cut sheet container 22, when an upper feed motor (not shown) is driven under control of the controller 10 and the upper feeding roller 3*e* rotates, the cut sheet Pc at the uppermost position among the plurality of cut sheets Pc accommodated in the cut sheet container 22 is fed toward the conveyance roller 3*c*.

Each of the intermediate roller pair 3*b*, the conveyance roller pair 3*c*, and the sheet discharge roller pair 3*d* includes a driving roller that rotates by the driving force of a conveyance motor (not shown) and a driven roller that accompanies the driving roller. The conveyance motor is driven by control of the controller 10, and the intermediate roller pair 3*b*, the conveyance roller pair 3*c*, and the sheet discharge roller pair 3*d* rotate while holding the sheet P, so that the sheet P is conveyed in the conveyance direction A along the conveyance path C1 or C2.

The conveyance direction A is configured to be reversed between the intermediate roller pair 3*b* and the conveyance roller pair 3*c*, or between the guide 8 and the conveyance roller pair 3*c*. In the present embodiment, the front-rear direction components in the conveyance direction A are opposite in the portions from the containers 11 and 12 to the intermediate roller pair 3*b* in the conveyance path C1 and from the conveyance roller pair 3*c* to the sheet discharge tray 6 in the conveyance path C1. Similarly, the front-rear direction components in the conveyance direction A are opposite between the portion from the container 22 to the guide 8 in the conveyance path C2 and the portion from the conveyance roller pair 3*c* to the sheet discharge tray 6 in the conveyance path C2.

The guide 7 is arranged between the lower feeding roller 3*a* and the intermediate roller pair 3*b* in the conveyance path C1, and guides the sheet P fed by the lower feeding roller 3*a* to the intermediate roller pair 3*b*. The guide 7 has a rear side wall of the lower sheet feed tray 1, and is inclined so as to be positioned upward from front to rear. A surface of the guide 7 (i.e., the surface defining the conveyance path C1) is formed with fine irregularities 7*x* that repeat along the conveyance direction A. The irregularities 7*x* can prevent overfeeding (i.e., a phenomenon in which a plurality of cut sheets Pc are conveyed in an overlapped state).

The guide 8 is disposed between the upper feeding roller 3*e* and the conveyance roller pair 3*c* in the transport path C2, and guides the sheet P fed by the upper feeding roller 3*e* to the conveyance roller pair 3*c*. The guide 8 has a rear side wall of the upper sheet feed tray 2, and is inclined so as to be positioned upward from front to rear. A surface of the guide 8 (i.e., the surface defining the conveyance path C2) has fine irregularities 8*x* that repeat along the conveyance direction A. The irregularities 8*x* can prevent the overfeeding.

The guide 9 is arranged between the intermediate roller pair 3*b* and the conveyance roller pair 3*c* in the conveyance path C1, and guides the sheet conveyed by the intermediate roller pair 3*b* to the conveyance roller pair 3*c*. The guide 9 has a pair of path members 9*a* and 9*b* arranged so as to sandwich the conveyance path C1. The path member 9*a* of the guide 9 guides the sheet P that has passed through the guide 8 in the conveyance path C2 to the conveyance roller pair 3*c*.

The cutter mechanism 4 is configured to cut the sheet P (i.e., the rolled sheet P unwound from the roll body R) at a position between the guide 7 and the intermediate roller pair 3*b* in the conveyance path C1 (i.e., at a particular position Cx). The cutter mechanism 4 includes a cutter 4*a*, a cutter unit 4*b* to which the cutter 4*a* is attached, and a holder 4*c* that holds the cutter unit 4*b*, and the cutter mechanism 4 can be reciprocated in the scanning direction (i.e., the direction orthogonal to the conveyance direction A at the particular position Cx) by a scanning mechanism (not shown).

The conveyance path C1 includes a linear portion Cs between the lower feeding roller 3*a* and the intermediate roller pair 3*b*. The particular position Cx, where the cutter mechanism 4 is arranged, is defined at a position in the straight portion Cs.

The cutter 4*a* has a pair of rotating blades 4*a*1 and 4*a*2 arranged to sandwich the conveyance path C1. The pair of rotating blades 4*a*1 and 4*a*2 have portions that are orthogonal to the conveyance path C1 and overlap each other. Concretely, among the pair of rotary blades 4*a*1 and 4*a*2, the rotary blade 4*a*1 is arranged on a downstream side of the conveyance direction A while the rotary blade 4*a*2 is arranged on an upstream side of the conveyance direction A. The pairs of the rotary blades 4*a*1 and 4*a*2 have portions that overlap each other when viewed from the conveyance direction A.

The cutter unit 4*b* rotatably supports each of the pair of rotary blades 4*a*1 and 4*a*2. The holder 4*c* is a case-shaped member that holds the cutter unit 4*b* from the outside.

When a cutting motor (not shown) included in the scanning mechanism is driven under control of the controller 10, the cutter mechanism 4 moves from a standby position D outside the conveyance path C1 to inside the conveyance path C1. At this time, the rotary blades 4A1 and 4A2 rotate due to the drive of the cutting motor. The roll sheet P unwound from the roll body R is cut in the width direction of the sheet P by the cutter 4*a* at the particular position Cx.

The head 5 is arranged between the conveyance roller pair 3*c* and the sheet discharge roller pair 3*d* in the conveyance paths C1 and C2. The head 5 corresponds to the "image forming engine" according to the present disclosures and includes a plurality of nozzles (not shown) formed on the lower surface and a driver IC 5*a* (see FIG. 3). When ejection data based on image data is supplied from the controller 10 to the driver IC 5*a*, ink is ejected from the nozzles, and an image is formed on the sheet P when the sheet P conveyed by the conveyance mechanism 3 passes through the position facing the lower surface of the head 5. In the present embodiment, the head 5 is configured to eject four colors of ink, that is, magenta (M), cyan (C), yellow (Y), and black (BK) ink. The head 5 may be either a line type, in which ink is ejected from the nozzle while the position thereof is fixed, or a serial type, in which ink is ejected from the nozzle while moving in the scanning direction.

The sheet P on which the image has been formed by the head 5 is received in the sheet discharge tray 6, which is open to the housing 100*a*.

The ink reservoir 31 is connected to the head 5 by a tube (not shown in the drawing), and supplies ink to the head 5. In this embodiment, the ink reservoir 31 stores four colors of ink, that is, magenta (M), cyan (C), yellow (Y), and black (BK) ink. As described below, the remaining amount of ink of each color in the ink reservoir 31 is repeatedly calculated by the controller 10 at certain time intervals, and the latest data is stored in the EEPROM 10*d* (see FIG. 3). The ink reservoir 31 may be a cartridge type reservoir which itself can be replaced with a new ink reservoir 31 containing a full amount of ink, or the ink reservoir 31 may be a tank type reservoir which can be refilled with ink in a fixed container. In the present embodiment, the ink reservoir 31 may have one container for each color, or two or more containers for each color (e.g., a main tank and a sub-tank). In that case, the remaining amount of ink of each color in the ink reservoir 31 is the sum of the remaining amounts of the two or more containers for each color.

Empty sensors 32 are arranged near the ink reservoir 31 for each ink. Each empty sensor 32 is an optical sensor that includes a light emitter and a light receiver, and configured to detect that the remaining amount of ink in the ink reservoir 31 is less than a particular amount (e.g., near empty).

The roll sheet sensor 18 and the cut paper sensor 19*a* are attached to the lower sheet feed tray 1. The roll sheet sensor 18 has a movable actuator and an optical sensor having a pair of light receiver and a light emitter. The movable actuator is located below a groove 11*z* so as to interfere with the roll sheet P that is unwound from the roll body R and moves toward the guide 7. As shown in FIG. 1, when the movable actuator interferes with the roll sheet P that is unwound from the roll body R and headed for the guide 7, the movable actuator is displaced and the roll sheet sensor 18 outputs an ON signal to the controller 10. When, as shown in FIG. 2, the movable actuator does not interfere with the roll sheet P that is unwound from the roll body R and headed for the guide 7, the roll sheet sensor 18 outputs an OFF signal to the controller 10. Therefore, the roll sheet sensor 18 outputs information to the controller 10 as to whether or not the roll body R is contained in the lower sheet feed tray 1.

The cut sheet sensor 19*a* is an optical sensor (i.e., a pair of light receiver and a light emitter) that emits light toward the cut sheet container 12 and receives the reflected light, thereby outputting an ON signal to the controller 10 when there is cut sheet in the cut sheet container 12, and outputting an OFF signal to the controller 10 when there is no cut sheet in the cut sheet container 12. Thus, the roll sheet sensor 18 and the cut sheet sensor 19*a* work together to output, to the controller 10, information on whether the lower sheet feed tray 1 contains recording media and information on the type of the recording media contained therein. A cut sheet sensor 19*b*, similar to the cut sheet sensor 19*a*, is attached to the upper sheet feed tray 2. The cut sheet sensor 19*b* outputs an ON signal to the controller 10 when there is cut sheet in the cut sheet container 22, and outputs an OFF signal to the controller 10 when there is no cut sheet. Thus, the roll sheet sensor 18 and the cut sheet sensors 19*a* and 19*b* work together to output, to the controller 10, information on whether or not a recording medium is stored in the lower sheet feed tray 1 and the upper sheet feed tray 2, respectively, and on the type of the stored recording medium.

Configuration of Controller

Figure 3:
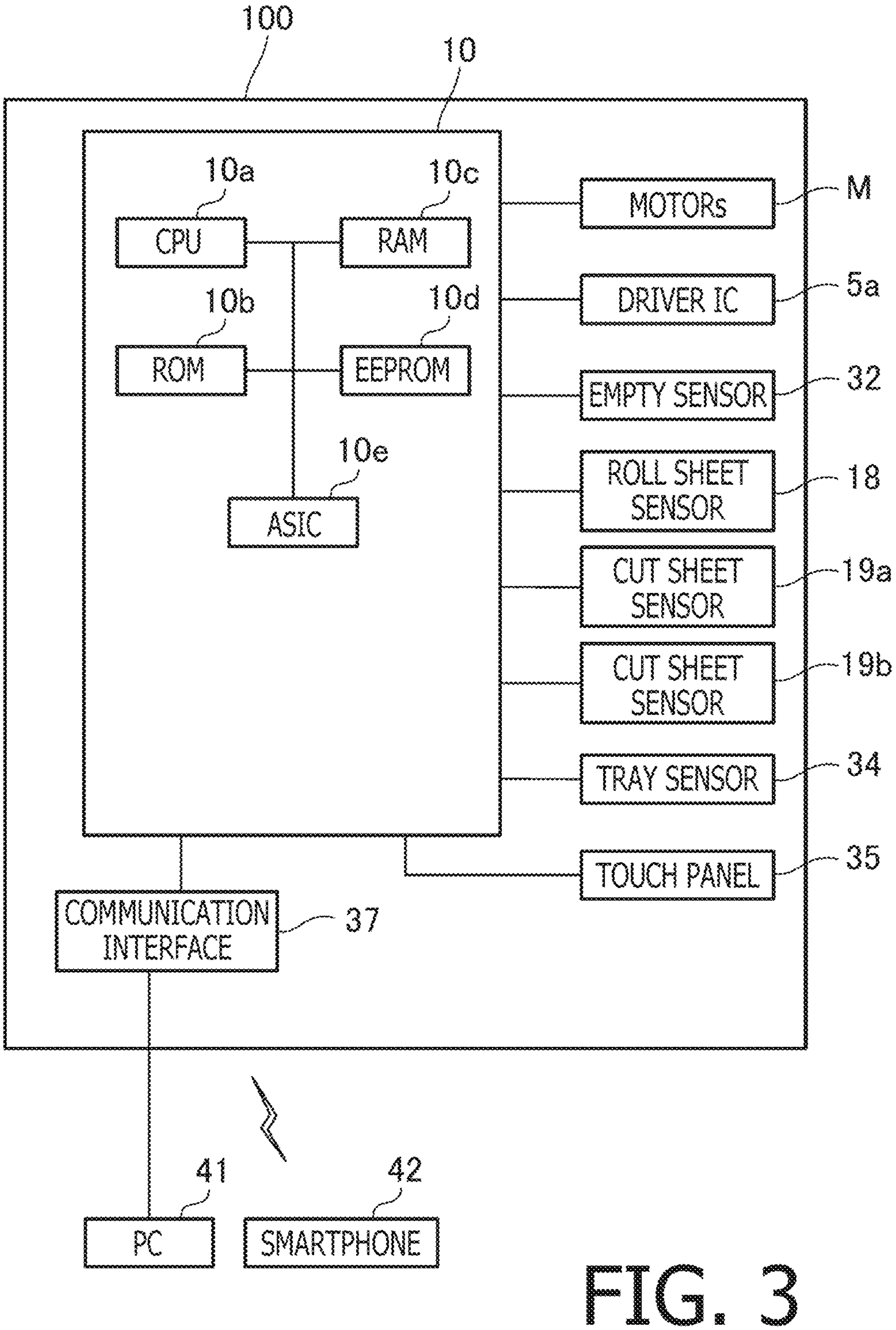
FIG. 3 is a block diagram of the printer shown in FIG. 1.

Next, the controller 10 that controls an operation of the printer 100 will be described. As shown in FIG. 3, the controller 10 includes a CPU (Central Processing Unit) 10*a*, a ROM (Read Only Memory) 10*b*, a RAM (Random Access Memory) 10*c*, an EEPROM (Electrically Erasable Programmable Read Only Memory) 10*d*, and an ASIC (Application Specific Integrated Circuit) 10*e*.

The CPU 10a performs various operations according to programs. The ROM 10b stores programs for controlling the printer 100, various settings, initial values, and the like. The RAM 10c is used as a work area for developing various programs or as a storage area to temporarily store data. The EEPROM 10d is a rewritable non-volatile memory. The ASIC 10e performs particular operations.

The motors M, a driver IC 5a, four empty sensors 32 (only one is indicated in FIG. 3), the roll sheet sensor 18, the cut sheet sensor 19a, the cut sheet sensor 19b, the tray sensor 34, the touch panel 35, and a communication interface 37 are electrically connected to the controller 10. The motors M include the upper sheet feed motor, the lower sheet feed motor, the conveyance motor and the cutting motor described above. The tray sensor 34 outputs signals, to the controller 10, indicating whether or not the lower sheet feed tray 1 and the upper sheet feed tray 2 are mounted in particular positions, respectively. Although the tray sensor is provided for each of the lower sheet feed tray 1 and the upper sheet feed tray 2, it is assumed that a single tray sensor can detect the mounting of the both trays in the following description. The touch panel 35 is a user interface with input and display functions, and includes a color display including a display module such as liquid crystal or organic EL (Electro Luminescence) display, and a transparent position input device covering the color display. The communication interface 37 may be a wired interface such as a USB (Universal Serial Bus) port, or a wireless interface. Via the communication interface 37, the printer 100 can transmit and receive data to and from an external device such as a PC (Personal Computer) 41 or a smart phone 42.

The controller 10 obtains the image data from the communication interface 37 or the USB port (not shown) provided to the printer 100. From the image data, the controller 10 creates ejection data indicating the amount of ink discharged from each nozzle for each ejection cycle. Then, by controlling the motors M and the driver IC 5a based on the ejection data, the desired sheet is conveyed from one of the three containers (i.e., the roll sheet container 11 and cut sheet containers 12 and 22), and the ink is ejected from the head 5 to form an image on the sheet P.

The remaining amount of the ink of each color in the ink reservoir 31 is stored in the EEPROM 10d. The controller 10 repeatedly calculates the amount of ink ejected from the head 5 (i.e., the used amount of ink used) based on the image data or ejection data at certain time intervals (e.g., every particular time, every time when printing of one sheet is completed, or every time when one print job is completed). The amount of ink ejected from the head 5 includes the ink ejected from the head 5 when performing maintenance work on the head 5 such as flushing and purging. The amount of remaining ink is then updated by subtracting the used amount of ink from the amount of remaining ink stored in EEPROM 10d, and the updated latest amount of remaining ink is stored in EEPROM 10d. The controller 10 initializes the stored remaining amount and returns the remaining amount to the maximum value when the cartridge is replaced or when the tank is refilled with ink. In this embodiment, the EEPROM 10d serves as a remaining amount signal output unit.

In addition, EEPROM 10d stores the ink consumption per sheet of the particular paper specified by standard (e.g., ISO (International Organization for Standardization)), and the length (i.e., the length along the conveying direction) of the particular sheet, such as A4 size sheet, specified by the standards. The controller 10 derives, for each ink, the length of the sheet P on which image formation can be performed until the ink in the ink reservoir 31 runs out by multiplying the remaining ink consumption stored in the EEPROM 10d by a first coefficient (i.e., a length derivation process). In the present embodiment, the first coefficient is calculated as (length of the particular sheet)/(ink consumption per the particular sheet as specified by the standard). As a modification, the first coefficient may be stored in the EEPROM 10d instead of the ink consumption per particular sheet and the length of the particular sheet. As the first coefficient, a value set by a user through user operation of the touch panel 35, the reciprocal of the ink consumption per unit length calculated from the history related to image formation in the printer 100, or the like may be used.

The controller 10 also derives, for each ink, the number of cut sheets Pc on which image formation can be performed until the ink in the ink reservoir 31 runs out, by multiplying the remaining amount of ink stored in the EEPROM 10d by a second coefficient (i.e., a number-of-sheet derivation process). In the present embodiment, the second coefficient is calculated as (length of the particular sheet)/[(ink consumption per sheet of the particular sheet specified in the standard)*(length of the cut sheet Pc)]. It is noted that, in the present embodiment, the cut sheet Pc to be used may be of a particular type specified by a standard such as ISO. As a modification, the second coefficient may be stored in the EEPROM 10d. As the second coefficient, a value set by a user through user operation of the touch panel 35, the reciprocal of the ink consumption per sheet of cut paper calculated from the history related to image formation in the printer 100, or the like may be used.

When a particular condition described below is satisfied, the controller 10 displays the remaining amount of the ink of each color on the touch panel 35 (or on the display of the PC 41 or the display of the smartphone 42) in the form of a bar graph within a graphic that is modeled on the ink reservoir 31. Further, when a particular condition described below is satisfied, the controller 10 displays the length of the sheet P capable of image formation derived in the length derivation process on the touch panel 35 (or the display of the PC 41 or the display of the smartphone 42) for each ink (i.e., a length display process). In the length display process, the controller 10 can display the length of the sheet P on which the images can be formed on the display for each ink based on a unit of length (in the present embodiment, in millimeters).

Figure 4A:
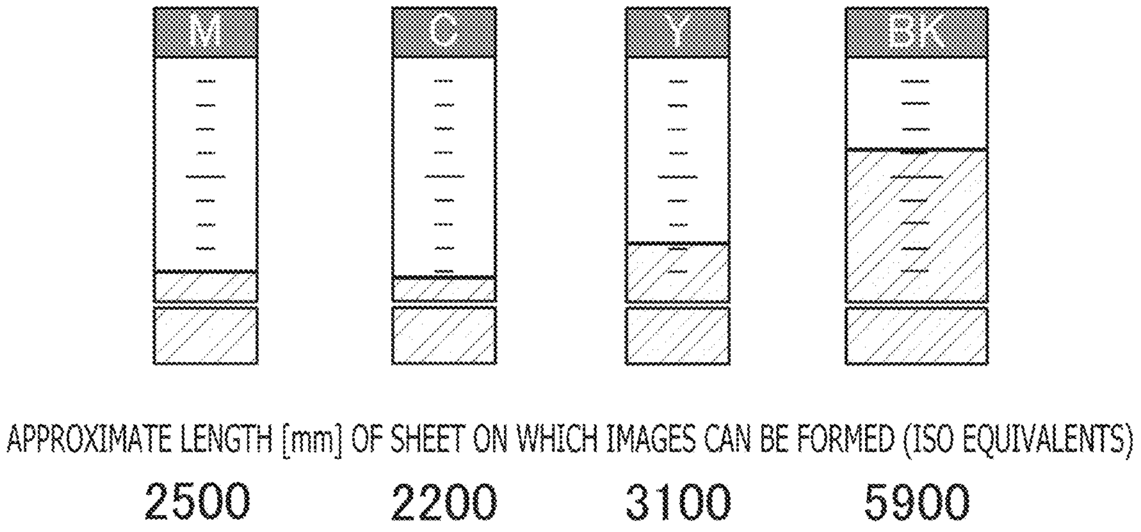
FIGS. 4A and 4B show examples of an ink level display screen on a touch panel included in the printer shown in FIG. 1.

FIG. 4A is an example of the screen displayed on the touch panel 35 in the length display process. In this example, it is indicated that the length of sheet P, on which the image can be formed, in ISO equivalent is 2500 mm for magenta (M), 2200 mm for cyan (C), 3100 mm for yellow (Y), and 5900 mm for black (BK). In addition, in FIG. 4A, above the indication of the length of the sheet P on which the image can be formed, the remaining amount of the ink of each color is indicated in the form of a bar graph-like display (i.e., a remaining amount bar) within a graphic image of the ink reservoir 31. In this example, the ink of each color is stored in two separate containers (i.e., a main tank and a sub-tank).

In addition, when a particular condition described below is met, the controller 10 displays the number of sheets of the cut sheets Pc on which the image can be formed by the number of sheets derived in the number-of-sheet derivation process on the touch panel 35 (or the display of PC 41 or the display of the smartphone 42) for each ink (i.e., a number-of-sheet display process).

Figure 4B:
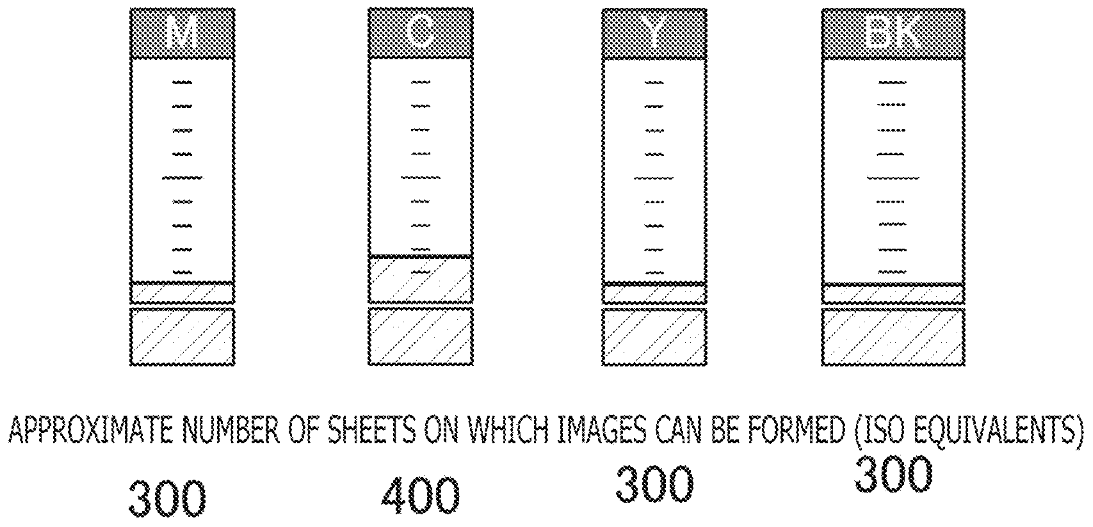

FIG. 4B is an example of the screen displayed on the touch panel 35 by the number-of-sheet display process. In this example shown in FIG. 4B, it is indicated that the number of sheets P on which images can be formed in ISO equivalent is 300 sheets for magenta (M), 400 sheets for cyan (C), 300 sheets for yellow (Y), and 300 sheets for black (BK). In addition, in FIG. 4B, above the indication of the number of sheets P on which the images can be formed, the remaining amount of the ink of each color is indicated in a bar graph-like display form in a graphic that is modeled on the ink reservoir 31.

Further, the EEPROM 10*d* stores usage history information of the roll body R and the cut sheet Pc used by the printer 100. The usage history information includes, for example, information on which of the roll sheets and the cut sheets Pc were used for image formation in each job within a particular period of time (e.g., the most recent one month) or in each job of a particular number of print jobs (e.g., the most recent one job or the most recent 100 jobs), and information on the usage rate of the roll sheets and the cut sheets Pc within a particular period of time or the like. The EEPROM 10*d* also contains information on the usage rate of the roll sheets and the cut sheets Pc for a particular period of time, etc. The EEPROM 10*d* also stores usage tray and media information on whether images are formed on the roll sheets and cut sheets Pc of the lower sheet feed tray 1 or the cut sheets Pc of the upper sheet feed tray 2. The usage tray and media information can be rewritten by the user by operating the touch panel 35. Thus, EEPROM 10*d* also functions as a history storage and a usage medium storage, and a usage tray storage.

Operation Procedure for Remaining Amount Display

Figure 5:
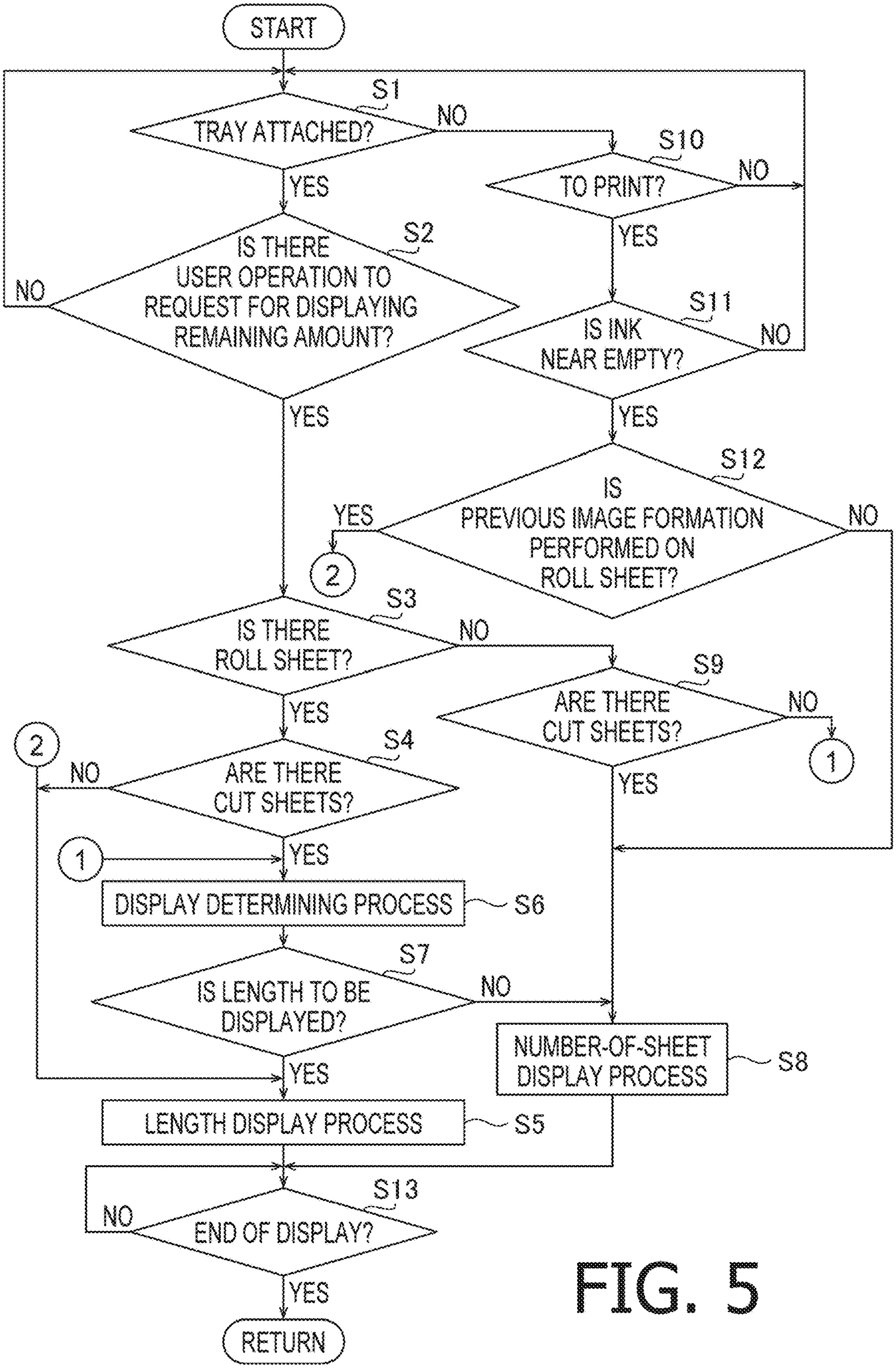
FIG. 5 is a flowchart illustrating a remaining ink amount of the printer shown in FIG. 1 according to the embodiment of the present disclosures.

Next, the operational procedures pertaining to the length display process and the number-of-sheet display process in the printer 100 of the present embodiment will be described with further reference to FIG. 5. The operations described below is mainly performed by the controller 10.

First, in S1, the controller 10 determines, based on the output signal from the tray sensor 34, whether a state of either the lower sheet feed tray 1 or the upper sheet feed tray 2 has changed from a non-attached state to an attached state. When the state has changed to the attached state (S1: YES), the controller 10 proceeds to S2. In S2, the controller 10 firstly displays a screen to inquire the user whether the user wishes to display the remaining amount display screen on the touch panel 35. When a request to display the remaining amount display screen is received from the touch panel 35 (S2: YES), the controller 10 proceeds to S3. When an input indicating that the user does not wish to display the remaining amount display screen is received from the touch panel 35 (S2: NO), the controller 10 returns to S1.

In S3, the controller 10 determines, based on the output signal of the roll sheet sensor 18, whether or not the roll body R is accommodated in the lower sheet feed tray 1. When the controller determines that the roll body R is accommodated in the lower sheet feed tray 1 (S3: YES), the controller 10 proceed to S4. When the controller 10 determines that the roll body R is not accommodated in the lower sheet feed tray 1 (S3: NO), the controller 10 proceeds to S9.

In S4, based on the output signal of the cut paper sensor 19*b*, the controller 10 determines whether the cut sheets Pc are accommodated in the upper sheet feed tray 2. When it is determined that the cut sheets Pc are not accommodated in the upper sheet feed tray 2 (S4: NO), the controller 10 proceeds to S5. When it is determined that the cut sheets Pc are accommodated in the upper sheet feed tray 2 (S4: YES), the controller 10 proceed to S6. When proceeding to S5, the printer 100 accommodates only roll sheets, and when proceeding to S6, the printer 100 accommodates both roll sheets and the cut sheets.

In S5, the length display process described above is executed. As a result, as shown in FIG. 4A, the length of the sheet P, on which images can be formed, derived in the length derivation process, is displayed on the touch panel 35 (or the display of the PC 41 or the display of the smartphone 42) for each ink. The length derivation process may be performed at S5 or before (preferably, after the end of the most recent print job).

In S6, a display decision process to determine which of the length display process and the number-of-sheet display process should be given priority for execution is performed. Here, "given priority" may mean that only one of the display processes to be prioritized is performed, one of the display processes is performed and then the other is performed, a display area based on one display process is made larger than a display area based on the other display process, or a display time period based on one display process is made longer than a display time period based on the other display process. In the present embodiment, only one of the display processes to be prioritized is performed.

In the present embodiment, there are three modes of display decision process that the user can selectively adopt by operating the touch panel 35.

The first one of the three modes is based on whether the most recent image formation was performed using the roll sheet or the cut sheets Pc. In other words, when it is determined from the usage history information stored in the EEPROM 10*d* that the most recent image formation in the printer 100 was performed using the roll sheet, the controller 10 determines that the length display process is given priority for execution, while, when it is determined that the most recent image formation was performed using the cut sheets Pc, the controller 10 determines that the number-of-sheet display process is given priority for execution. It is noted that whether the most recent image formation was performed using the roll sheet or the cut sheets Pc may be determined based on information obtained from other sources such as, for example, image data pertaining to the most recent image formation, instead of using the usage history information stored in the EEPROM 10*d*.

The second one of the three modes is based on whether the roll sheet or the cut sheets Pc were used more for image formation within a particular period of time or during a particular number of print jobs in the past. That is, when it is determined based on the usage history information stored in EEPROM 10*d* that the usage rate of the roll sheet is higher than that of the cut sheets, it is determined that the length display process is given the priority for execution, while, when it is determined that the usage rate of the cut sheets is higher than that of the roll sheet, it is determined that the number-of-sheet display process is given the priority for execution.

The third one of the three modes is based on the information set by the user. As described above, the EEPROM 10*d* stores the usage tray and media information, which can be rewritten by the user, on whether the image is to be formed on the roll sheet and the cut sheets Pc in the lower sheet feed tray 1 or on the cut sheets Pc in the upper sheet feed tray 2. That is, when it is determined based on the usage tray and media information stored in EEPROM 10*d* that an image is to be formed on the roll sheet, it is decided that the length display process is given priority for execution, and when it is determined that an image is to be formed on the cut sheets, it is decided that the number-of-sheet display process is given priority for execution.

Next, in S7, the controller 10 determines whether it is the length display process or the number-of-sheet display process that was determined in the display decision process of S6. When it is determined that the length display process that was determined in the display decision process of S6, the controller 10 goes to S5 to execute the length display process, while, when it is determined that the number-of-sheet display process that was determined in the display decision process of S6, the controller 10 proceeds to S8. It is noted that the specific display contents in S5 or S8, which is proceeded from S7, should be changed depending on the meaning of "priority" described above. However, in the present embodiment, since it is assumed that only one of the display processes that is given priority is performed, there is no difference between a case where S5 or S8 is proceeded from S7 and a case where S5 or S8 is not proceeded from S7.

In S8, the number-of-sheet display process described above is executed. As a result, as shown in FIG. 4B, the number of sheets P, on which images can be formed, derived in the number-of-sheet derivation process, is displayed on the touch panel 35 (or the display of the PC 41 or the display of the smartphone 42) for each ink. It is noted that the number-of-sheet derivation process may be performed in S8 or earlier (preferably, after the end of the most recent print job).

In S9, based on the output signals of the cut paper sensors 19*a* and 19*b*, the controller 10 determines whether the cut sheets Pc are contained in the lower sheet feed tray 1 or the upper sheet feed tray 2. When it is determined that the cut sheets PC are not accommodated in the lower sheet feed tray 1 or the upper sheet feed tray 2 (S9: NO), the controller 10 proceeds to S6. When it is determined that the cut sheets PC are accommodated in the lower sheet feed tray 1 or the upper sheet feed tray 2 (S9: YES), the controller 10 proceeds to S8. When the controller 10 proceeds to S6, neither the roll sheet nor the cut sheets are accommodated in the printer 100, while, when the controller 10 proceeds to S8, only the cut sheet is accommodated in the printer 100. When it is determined that no sheet is accommodated (S9: NO), instead of proceeding to S6, the controller 10 may display a message informing the user that none of the roll sheet or the cut sheets are accommodated on the touch panel 35. Even when the controller 10 proceeds to S6, in the length display process (S5) or the number-of-sheet display process (S8) executed thereafter, the controller 10 may display the remaining ink level and a message informing the user that no paper is accommodated on the touch panel 35.

In S1, when the state of neither the lower sheet feed tray 1 nor the upper sheet feed tray 2 has changed from the non-attached state to the attached state (S1: NO), the controller 10 proceeds to S10. In S10, the controller 10 determines whether one print job has been completed (or one print job is to be started) in the printer 100. When it is determined that one print job has not been completed (S10: NO), the controller 10 returns to S1. When it is determined that one print job has been completed (S10: YES), the controller 10 proceeds to S11.

In S11, the controller 10 determines whether the remaining amount of the ink in at least one of the ink reservoirs 31 is less than a particular amount (i.e., near empty) based on the detection signals from the four empty sensors 32 arranged for each ink. When none of the remaining ink levels is below the near empty level (S11: NO), the controller 10 returns to S1. When at least one of the remaining ink levels is below the near empty (S11: YES), the controller 10 proceeds to S12.

In S12, based on the usage history information stored in the EEPROM 10*d*, the controller 10 determines whether or not the most recent image formation in the printer 100 is the one using the roll sheet. When it is determined that the roll sheet was used (S12: YES), the controller 10 proceeds to S5. When it is determined that the cut sheets were used (S12: NO), the controller 10 proceeds to S8. In other words, in the present embodiment, when at least one remaining ink level is below the near empty level, the ink level display screen corresponding to the type of sheet used in the most recent image formation is displayed even if the user does not wish to display the ink level display screen.

In S5 and S8, which is proceeded from S12, the remaining ink level may be displayed and a message informing the user that the remaining level is near empty with respect to the corresponding ink may be displayed on the touch panel 35.

Further, in S12, it is determined whether the most recent image formation was performed using the roll sheet, but instead of performing S12, steps S3, S4, S6, S7, and S9 may be performed.

After executing the length display process (S5) or the number-of-sheet display process (S8), the controller 10 proceeds to S13. In S13, the controller 10 determines whether a condition for extinguishing the screen (FIG. 4A, FIG. 4B) displayed on the touch panel 35 by the length display process or the number-of-sheet display process from the touch panel 35 has been satisfied. The condition may be, for example, that the user touches a display end button (not shown) of the touch panel 35, that a particular time has elapsed since the start of the display, that the printer 100 has received a new print job, that the ink reservoir 31, which is a cartridge type, has been replaced with a new ink reservoir 31, and the like.

According to the above-described embodiment, in the printer 100 capable of printing on the roll sheet, by performing the length derivation process to derive the length of the sheet on which images can be formed until the ink in the ink reservoir 31 runs out, and the length display process to display the length of the sheet derived in the length derivation process on the touch panel 35, and the like, based on the amount of ink remaining for each color in the ink reservoir 31, the user who intends to perform printing using the roll sheet can easily grasp how much image formation is possible before the ink in the ink reservoir 31 runs out.

In the present embodiment, since the length display process is executed when the roll sheet sensor 18 outputs information indicating that the roll body R is stored in the lower sheet feed tray 1 (S3: YES; S5), the user can easily grasp how much image formation is possible before the ink in the ink reservoir 31 runs out before performing the printing on the roll sheet.

In addition, in the present embodiment, when the roll sheet sensor 18 and the cut sheet sensor 19*b* output information that the roll body R is accommodated in the lower sheet feed tray 1 and the cut sheets Pc are not accommodated in the upper sheet feed tray 2 (S4: NO), the controller 10 executes the length display process. When the roll sheet sensor 18, the cut sheet sensor 19*a*, and the cut sheet sensor 19*b* output information that the roll body R is not accommodated in the lower sheet feed tray 1 and that the cut sheets Pc are accommodated in the lower sheet feed tray 1 or the upper sheet feed tray 2 (S9: YES), the number-of-sheet display process is executed. Thus, the user can be informed of how many cut sheets can be used for image formation before the printing on the cut sheets is performed, and the user can be informed of how long the roll sheet can be used for image formation before the printing on the roll sheet is performed.

In addition, since it is detected whether sheets are accommodated in the lower sheet feed tray 1 and the upper sheet feed tray 2 with use of the roll sheet sensor 18, the cut sheet sensor 19*a*, and the cut sheet sensor 19*b*, the display according to the type of the accommodated sheet can be made quickly.

In the present embodiment, when the roll body R is accommodated in the lower sheet feed tray 1 and the cut sheets Pc are accommodated in the upper sheet feed tray 2, the controller 10 executes the display decision process (S6). Therefore, the user can appropriately determine which of the length display process and the number-of-sheet display process should be executed first. As a concrete method of the display decision process, the one of the three modes described above selected by the user can be adopted.

Another Embodiment

Next, a printer according to another embodiment different from the above-described embodiment will be described. In the printer 100 according to the above-described embodiment, when the roll body R is accommodated in the lower sheet feed tray 1 and the cut sheets Pc are stored in the upper sheet feed tray 2 (S4: YES), the controller 10 performs the display decision process (S6) to determine which of the length display process and the number-of-sheet display process should be performed first. In the present embodiment, however, the length display process and the number-of-sheet display process are executed simultaneously without performing the display decision process. Other than the above configuration, the printer according to the present embodiment is the same as the printer 100 described above.

Figure 6:
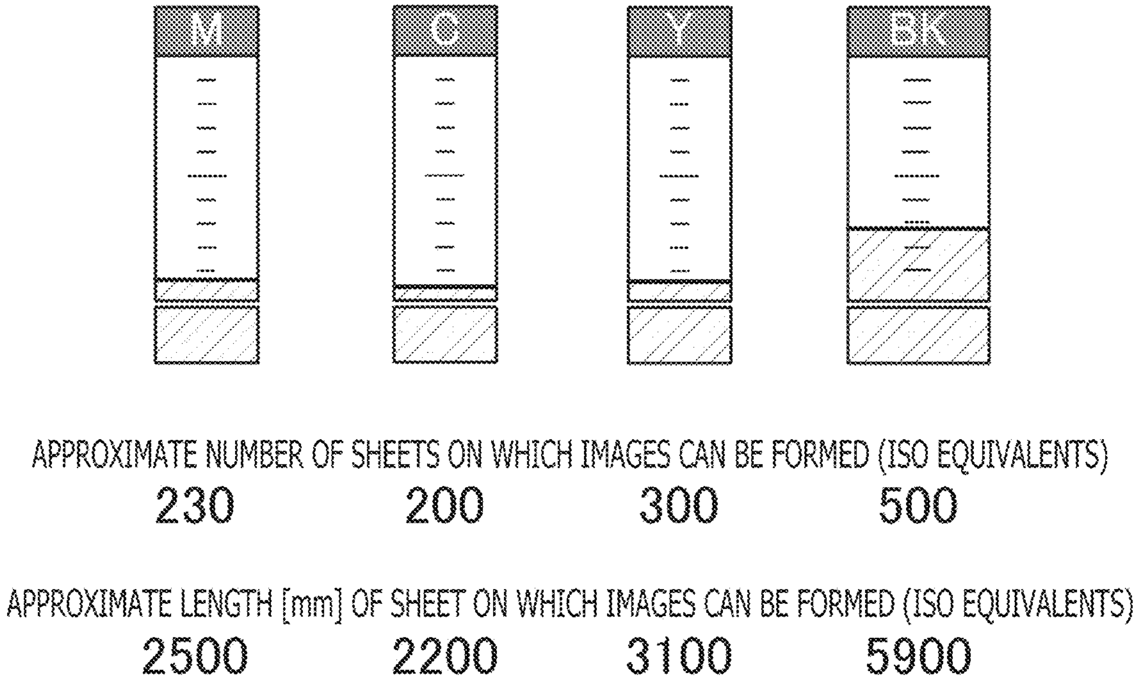
FIG. 6 shows a remaining ink amount display screen according to another embodiment of the present disclosures.

FIG. 6 shows an example of a screen displayed on the touch panel 35 when the length display process and the number-of-sheet display process are executed simultaneously. In this example, it is shown that the number of sheets P on which images can be formed in terms of ISO is 230 for magenta (M), 200 for cyan (C), 300 for yellow (Y), and 500 for black (BK), and that the length of the sheet P on which images can be formed in terms of ISO is 2500 mm for magenta (M), 2200 mm for cyan (C), 3100 mm for yellow (Y), and 5900 mm for black (BK), which are displayed in parallel above and below. In addition, in FIG. 6, above the number of sheets P on which images can be formed, the remaining amount of the ink for each color is displayed in the form of a bar graph in a graphic of the ink reservoir 31. In this example, the ink of each color is stored in two separate reservoirs (main tank and sub-tank).

According to the present embodiment, when the roll body R is accommodated in the lower sheet feed tray 1 and the cut sheets Pc is accommodated in the upper sheet feed tray 2, the length display process and the number-of-sheet display process are executed simultaneously, so that the user can be informed of the number and length of sheets P on which images can be formed at the same time.

Further Embodiments

Figure 7A:
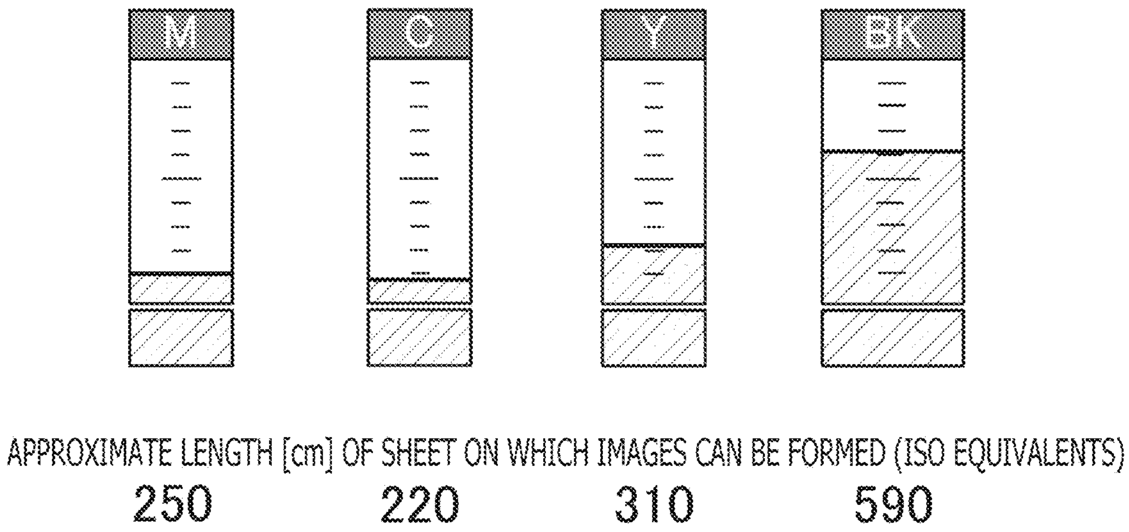
FIGS. 7A and 7B show examples of the remaining ink amount display screen according to a further embodiment of the present disclosures.

Next, a printer according to a further embodiment will be described. In the printer 100 pertaining to the above-mentioned embodiment, in the length display process, the length of the sheet P on which images can be formed is displayed in units of millimeters (mm) as shown in FIG. 4A. According to the present embodiment, however, the length of the sheet P on which images can be formed is displayed in units of centimeters (cm) as shown in FIG. 7A. In the example shown in FIG. 7A, it is indicated that the length of the sheet P on which images can be formed in ISO equivalent is 250 cm for magenta (M), 220 cm for cyan (C), 310 cm for yellow (Y), and 590 cm for black (BK). Other than the configuration described above, the printer according to the further embodiment is the same as the printer 100 described above.

Figure 7B:
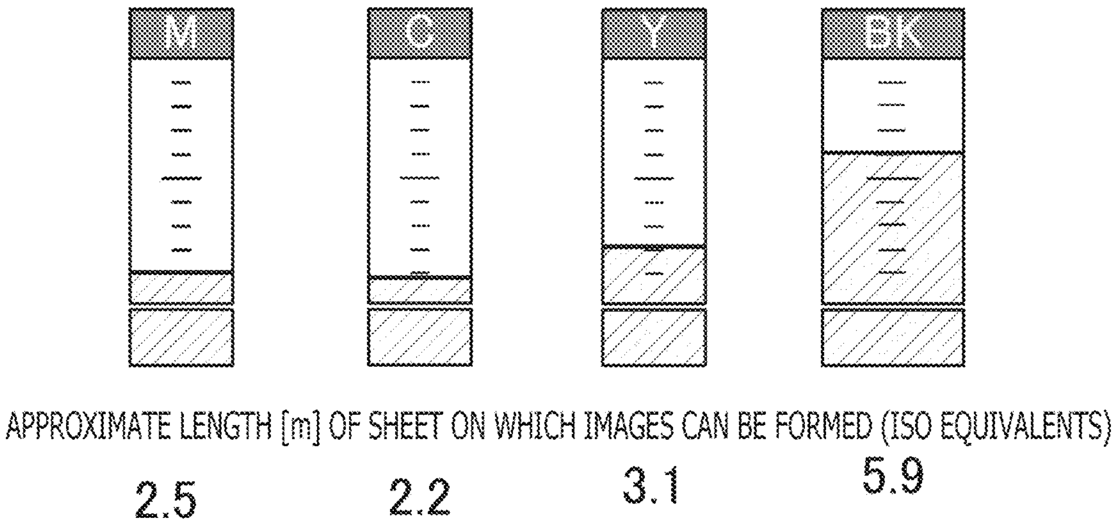

In the printer of according to yet another embodiment, in the length display process, the length of the sheet P on which images can be formed is displayed in meters (m) as shown in FIG. 7B. In the example shown in FIG. 7B, it is indicated that the length of the sheet P on which images can be formed in ISO equivalent is 2.5 m for magenta (M), 2.2 m for cyan (C), 3.1 m for yellow (Y), and 5.9 m for black (BK). Other than the above configuration, the printer is the same as the printer 100 described above.

Figure 8A:
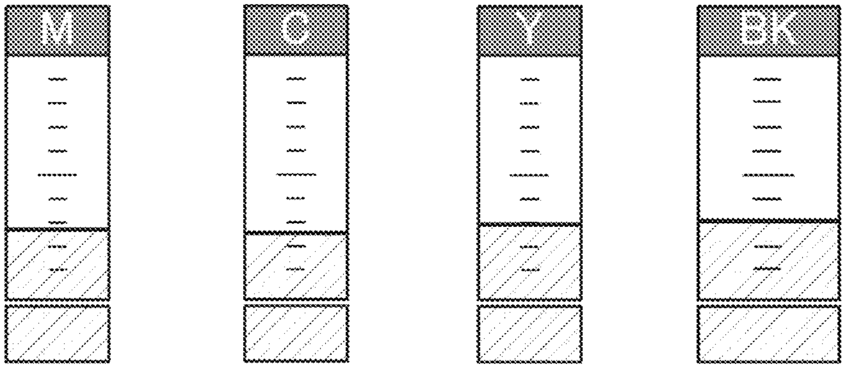
FIGS. 8A and 8B show examples of the remaining ink amount display screen according to a furthermore embodiment of the present disclosures.

In the printer of yet another embodiment, in the length display process, the length of the sheet P on which images can be formed is displayed in units of inches (inch) as shown in FIG. 8A. In the example shown in FIG. 8A, it is displayed that the length of the sheet P on which images can be formed in ISO equivalent is 900 inches for magenta (M), 880 inches for cyan (C), 930 inches for yellow (Y), and 940 inches for black (BK). Other than the above configuration, the printer is the same as the printer 100 described above.

Figure 8B:
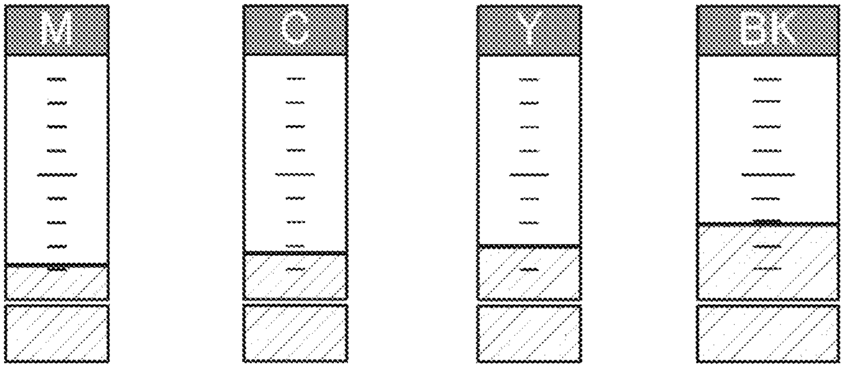

In the printer according to still another embodiment, in the length display process, the length of the sheet P on which images can be formed is displayed in units of feet (FEET) as shown in FIG. 8B. In the example shown in FIG. 8B, it is indicated that the length of the sheet P on which images can be formed in ISO equivalent is 140 feet for magenta (M), 180 feet for cyan (C), 200 feet for yellow (Y), and 260 feet for black (BK). Other than the configuration above, the printer is the same as the printer 100 described above.

As a modification, the user may be able to select, by operating the touch panel 35, whether to display the length of the sheet P on which images can be formed in units of m, cm, mm, feet, or inches in the length display process.

Modifications

In the foregoing, various embodiments and modifications according to the present disclosures are described. However, aspects of the present disclosures do not need to be limited to the above-mentioned embodiments/modifications, but various modifications can be made.

Although the printer 100 according to the above-described embodiment has the roll sheet sensor 18 and the cut sheet sensors 19*a* and 19*b* that function as media information output units, the image forming device according to the present invention may not have a media information output unit. In the printer 100 according to the above-described embodiment, the lower sheet feed tray 1 is capable of accommodating roll sheet and the cut sheets together, but in the image forming device according to the present disclosures, the lower sheet feed tray may be capable of accommodating only the roll sheet, or the lower sheet feed tray may be capable of accommodating either roll sheet or the cut sheets exclusively (i.e., when the roll sheet is accommodated, the cut sheets cannot be accommodated, and when the cut sheets are accommodated, the roll sheet cannot be accommodated).

In addition, although the printer 100 according to the embodiment described above has two sheet feed trays 1 and 2, the image forming device according to the present modification may have only one sheet feed tray that can accommodate only a roll sheet, or may have two or more sheet feed trays that can accommodate roll sheets. In such cases, the length display process may be always performed or only when a particular condition (e.g., a particular operation by the user) is satisfied. In place of the sheet feed tray, a supply unit (e.g., a multi-purpose (MP) tray) that does not contain recording media but is capable of supplying recording media to the conveyance path may be used. The sheet feed tray may not be removable, but may be fixed to the main unit.

The image forming device according to the present disclosures may have one or more sheet feed trays that can accommodate the cut sheets, and when the cut sheets are accommodated therein, the number-of-sheet display process may not be performed. Concretely, the image forming device according to the present disclosures may have one or more sheet feed trays that can accommodate a roll sheet (only a roll sheet, or a roll sheet and a plurality of stacked cut sheets together or exclusively), and one or more sheet feed trays that can accommodate the cut sheets (only the cut sheets, or the roll sheet and a plurality of stacked cut sheets together or exclusively). The image forming device further includes a media information output unit that outputs information on whether or not a roll sheet is accommodated in any of the sheet feed trays. When the media information output unit outputs the information that a roll sheet is accommodated in one of the sheet feed trays, the controller includes one that executes the length display process regardless of whether or not the cut sheets are stored in any of the sheet feed trays. As an example, in the above-described embodiment, when it is determined that a roll body R is accommodated in the lower sheet feed tray 1 (S3: YES), the process of S4 may be omitted and the length display process (S5) may be executed.

The image forming device according to the present disclosures has one sheet feed tray that can accommodate a roll sheet and a plurality of stacked cut sheets together or exclusively. When the media information output unit outputs information indicating that only the roll sheet is accommodated in the sheet feed tray, the controller 10 performs the length display process, and when the media information output unit outputs information indicating that only the cut sheets are accommodated in the sheet feed tray, the controller 10 performs the number-of-sheet display process.

In this case, instead of the roll sheet sensor 18 and the cut sheet sensor 19*a*, a storage such as the EEPROM 10*d* can be used as the media information output unit. The controller 10 can rewritably store, in the EEPROM 10*d*, based on the user operation of the touch panel 35, information indicating that the sheet accommodated in the lower sheet feed tray 1 is only the roll sheet, only the cut sheets, or both roll sheet and the cut sheets.

The image forming device according to the present disclosures includes one sheet feed tray that can accommodate a roll sheet and a plurality of stacked cut sheets together. The image forming device includes one configured to, when the media information output unit outputs information indicating that both the roll sheet and the cut sheets are accommodated in the sheet feed tray, perform a display decision process to determine which of the length display process and the number-of-sheet display process should be performed with priority, and one that executes both the length display process and the number-of-sheet display process simultaneously.

The remaining amount output device may be a sensor that detects the remaining amount of color material in real time, rather than a storage device such as the EEPROM. As a long recording medium, an unrolled long medium may be employed instead of a roll sheet. The recording medium is not necessarily limited to particular material, but may be, for example, paper, cloth, resin material, and the like.

In the present invention, the image forming engine may be a laser engine that uses toner as a color material instead of an inkjet head that ejects ink. The present disclosures are not necessarily limited to be applied to printers, but can also be applied to facsimiles, copiers, multifunction devices, and the like.

What is claimed is:

1. An image forming device, comprising:

a first supplier configured to supply a long recording medium along a conveying direction;

an image forming engine configured to form an image on the long recording medium supplied from the first supplier using a color material supplied from a color reservoir, the color reservoir being configured to store the color material;

a remaining amount output device configured to output a signal indicating a remaining amount of the color material stored in the color reservoir; and a controller, wherein the controller is configured to perform:

deriving a length of the long recording medium on which images can be formed until the color material in the color reservoir runs out based on the signal output by the remaining amount output device, the length of the long recording medium being measured in a unit of length along the conveying direction different from a number of recording media;

wherein the first supplier is configured to accommodate the long recording medium and a plurality of stacked recording media, together or exclusively, each of the plurality of stacked recording media being a short recording medium having a particular length;

wherein the image forming device further comprises a medium information output device configured to output information indicating a type of recording medium accommodated in the first supplier; and wherein the controller is further configured to perform:

deriving a number of short recording media on which images can be formed until the color material in the color reservoir runs out based on the signal output by the remaining amount output device;

displaying the number of the short recording media, on which images can be formed, derived from the deriving the number of the short recording media on a display;

displaying the length of the long recording medium when the medium information output device outputs information indicating that a recording medium accommodated in the first supplier is only the long recording medium; and displaying the number of recording medium when the medium information output device outputs information indicating that a recording medium accommodated in the first supplier is only the short recording medium.

2. The image forming device according to claim 1, wherein the medium information output device includes one or more sensors configured to detect a type of the recording medium accommodated in the first supplier.

3. The image forming device according to claim 1, wherein the medium information output device includes a usage medium storage configured to store information indicating a type of the recording medium accommodated in the first supplier so as to be rewritable by a user.

4. The image forming device according to claim 1, wherein, when the medium information output device outputs information indicating that the first supplier accommodates both the long recording medium and the short recording medium, the controller determines which of the displaying the length of the long recording medium and the displaying the number of the recording media is to be given a priority for execution.

5. The image forming device according to claim 4,
wherein, when the controller determines, in the determining, that the most recent image formation is performed using the long recording medium, the controller gives priority for displaying the length of the long recording medium, while when the controller determines, in the determining, that the most recent image formation is performed using the short recording medium, the controller gives priority for displaying the number of the recording media.

6. The image forming device according to claim 4, further comprising:
a history storage configured to store usage history information indicating usage history of the long recording medium and usage history of the short recording media in the image forming device,
wherein the controller is configured to perform:
when, in the determining, it is determined that a usage rate of the long recording medium is higher than a usage rate of the short recording media based on the history information stored in the history storage, determining that priority is given for the displaying the length of the long recording medium; and
when, in the determining, it is determined that the usage rate of the short recording media is higher than the usage rate of the long recording medium based on the history information stored in the history storage, determining that priority is given for the displaying the number of the recording media.

7. The image forming device according to claim 1,
wherein, when the medium information output device outputs information indicating that the first supplier accommodates both the long recording medium and the short recording medium, the controller is configured to perform both the displaying the length of the long recording medium and the displaying the number of the recording media simultaneously.

8. The image forming device according to claim 7, further comprising:
a usage medium storage configured to user-rewritably store usage medium history information indicating which of the long recording medium and the short recording media is to be used for forming images,
wherein, based on the used medium information stored in the usage medium storage, the controller is configured to perform:
when, in the determining, it is determined that the long recording medium is to be used for forming images, determining that priority is given for the displaying the length of the long recording medium; and
when, in the determining, it is determined that the short recording media is to be used for forming images, determining that priority is given for the displaying the number of the recording media.

9. The image forming device according to claim 1, further comprising:
a second supplier configured to supply a plurality of stacked short recording media each of which having a particular length.

10. The image forming device according to claim 1,
wherein the controller is configured to perform, in the displaying the length of the recording medium, displaying a length of the long recording medium on which images can be formed in a unit of one of meters, centimeters, millimeters, feet, and inch.

11. The image forming device according claim 1,
wherein the color material is ink, and
wherein the image forming engine includes an inkjet head.

12. The image forming device according to claim 1,
wherein the long recording medium includes a wound roll sheet.

13. An image forming device, comprising:
a first supplier configured to supply a long recording medium along a conveying direction;
an image forming engine configured to form an image on the long recording medium supplied from the first supplier using a color material supplied from a color reservoir, the color reservoir being configured to store the color material;
a remaining amount output device configured to output a signal indicating a remaining amount of the color material stored in the color reservoir;
a second supplier configured to supply a plurality of stacked short recording media each of which having a particular length;
a medium information output device configured to output information indicating whether each of the first supplier and the second supplier respectively stores recording media; and
a controller,
wherein the controller is configured to perform:
deriving a length of the long recording medium on which images can be formed until the color material in the color reservoir runs out based on the signal output by the remaining amount output device, the length of the long recording medium being measured in a unit of length along the conveying direction different from a number of recording media;
deriving a number of the short recording medium on which images can be formed until the color material in the color reservoir runs out based on the signal output by the remaining amount output device;
displaying the number of recording media, on which images can be formed, derived from the deriving the number of recording media on a display;
displaying the length of the long recording medium when the medium information output device outputs information indicating that the first supplier accommodates a recording medium and the second supplier does not accommodate a recording medium; and
displaying the number of recording medium when the medium information output device outputs information indicating that the first supplier does not accommodate a recording medium and the second supplier accommodates a recording medium.

14. The image forming device according to claim 13,
wherein the medium information output device includes one or more sensors configured to detect whether each of the first supplier and the second supplier accommodate recording media.

15. The image forming device according to claim 13,
wherein, when the medium information output device outputs information indicating that both the first supplier and the second supplier accommodate the recording medium, the controller performs determining which of the displaying the length of the long recording medium and the displaying the number of the recording media is to be given a priority for execution.

16. The image forming device according to claim 15, further comprising a usage tray storage configured to user-rewritably store usage tray information indicating which of the recording medium supplied from the first supplier and the recording medium supplied from the second supplier is to be used for forming images, wherein, based on the usage tray information stored in the usage tray storage, the controller is configured to perform:

when, in the determining, it is determined that the recording medium supplied from the first supplier is to be used for forming images, determining to give priority to the displaying the length of the long recording medium; and when, in the determining, it is determined that the recording medium supplied from the second supplier is to be used for forming images, determining to give priority to the displaying the number of the recording media.

17. The image forming device according to claim 13, wherein, when the medium information output device outputs information indicating that both the first supplier and the second supplier accommodate the recording medium, the controller performs both the displaying the length of the long recording medium and the displaying the number of the recording media simultaneously.

* * * * *